United States Patent
Meyer

(10) Patent No.: US 10,192,080 B2
(45) Date of Patent: Jan. 29, 2019

(54) METHOD FOR CONFIGURING A COMMUNICATION MODULE OF AT LEAST ONE RADIO-FREQUENCY IDENTIFICATION (RFID) READER AND COMMUNICATION MODULE

(71) Applicant: Siemens Aktiengesellschaft, Munich (DE)

(72) Inventor: Heinrich Meyer, Wendelstein (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 15/690,511

(22) Filed: Aug. 30, 2017

(65) Prior Publication Data

US 2018/0060616 A1    Mar. 1, 2018

(30) Foreign Application Priority Data

Aug. 30, 2016 (EP) .................................... 16186347

(51) Int. Cl.
*G06K 7/10* (2006.01)
*G06F 9/44* (2018.01)
(Continued)

(52) U.S. Cl.
CPC ........... *G06K 7/10227* (2013.01); *G06F 8/65* (2013.01); *G06F 9/4411* (2013.01);
(Continued)

(58) Field of Classification Search
None
See application file for complete search history.

(56) References Cited

U.S. PATENT DOCUMENTS

| 7,567,179 | B2 * | 7/2009 | Stephensen ............. H04W 4/02 235/462.01 |
| 9,184,987 | B2 | 11/2015 | Sequeira et al. |
| 2013/0241713 | A1 | 9/2013 | Weinlaender |

FOREIGN PATENT DOCUMENTS

| DE | 10300927 | 7/2004 |
| EP | 2546777 | 1/2013 |

(Continued)

*Primary Examiner* — Kim Huynh
*Assistant Examiner* — Danny Chan
(74) *Attorney, Agent, or Firm* — Cozen O'Connor

(57) ABSTRACT

A method for configuring a communication module of at least one RFID reader that is connected via the communication module to a communication network, wherein the at least one RFID reader is connected to the communication module via a serial interface, wherein configuration information comprising at least communication network address information and device type information is stored in a configuration storage unit of the communication module, where the configuration information stored in the configuration storage unit of the communication module is conveyed via the serial interface to the at least one RFID reader and stored there in a predetermined configuration storage area, and where the configuration information stored in the predetermined configuration storage area of the RFID reader is loaded during a device start of a replacement communication module used instead of the communication module after a successful validity check for configuration of the replacement communication device.

16 Claims, 2 Drawing Sheets

(51) Int. Cl.
*G06F 8/65* (2018.01)
*G06F 9/4401* (2018.01)
*H04L 29/12* (2006.01)
*H04L 12/24* (2006.01)

(52) U.S. Cl.
CPC ...... *G06K 7/10366* (2013.01); *H04L 41/0806* (2013.01); *H04L 41/0846* (2013.01); *H04L 61/2015* (2013.01); *H04L 61/6022* (2013.01)

(56) References Cited

FOREIGN PATENT DOCUMENTS

| EP | 2560347 | 2/2013 |
|----|---------|--------|
| WO | WO02052791 | 7/2002 |

\* cited by examiner

METHOD FOR CONFIGURING A COMMUNICATION MODULE OF AT LEAST ONE RADIO-FREQUENCY IDENTIFICATION (RFID) READER AND COMMUNICATION MODULE

BACKGROUND OF THE INVENTION

1. Field of the Invention

The present invention relates to radio-frequency identification (RFID) readers and, more particularly, to a method for configuring a communication module of at least one RFID reader and communication module.

2. Description of the Related Art

EP 2 546 777 B1 discloses a method for addressing at least one wirelessly accessible data memory, in which the addressing of the data memory occurs in a radio-based data exchange between the data memory and a read-write unit via a first identification number of the data memory. In this context, the first identification number of the data memory is associated with a second identification number via the read-write unit. For identification of the data memory, the second identification number is used during each data exchange of the read-write unit, with respect to this data memory, with an industrial automation component. With this, the automation component can use shortened identification numbers. At the same time, an unambiguous addressing is also provided between the automation component and the wirelessly accessible data memory.

DE 103 00 927 A1 relates to a network having a number of subscribers who are connected to one another by at least one communication channel for exchanging data. A network plug by which a subscriber is connected to the network has a memory in which the subscriber-specific data are stored for parameterization or configuration of the subscriber. During a restart of the subscriber or after an exchange by a replacement device, the subscriber-specific data are transferred from the memory into the newly connected subscriber.

WO2002/052791 A2 discloses a method for configuring terminals and network components within a network, where no expert is needed to exchange a device or component. The operating personnel only exchanges the terminal or the network component and plugs a configuration adapter into the serial interface, where the newly inserted terminal or the network component is automatically supplied with the stored configuration and started.

SUMMARY OF THE INVENTION

It is an object of the present invention to provide a device and method for configuring a communication module of Radio-Frequency Identification (RFID) reader that can be handled simply, quickly and reliably in the case of an equipment exchange.

This and other objects and advantages are achieved in accordance with the invention by a communication module and method for configuring a communication module of at least one RFID reader that is connected via the communication module to a communication network, where the at least one RFID reader is connected to the communication module via a serial interface. In a configuration storage unit of the communication module, configuration information comprising at least communication network address information and device type information is stored. Preferably, the communication information also comprises a device name of the communication module. The communication network address information can comprise, for example, a static IP address or a Media Access Control (MAC) address to be used for Dynamic Host Configuration Protocol Version 4 (DHCPv4). The configuration information stored in the configuration storage unit of the communication module is conveyed via the serial interface to the at least one RFID reader and stored within the at least one RFID Reader in a predetermined configuration storage area. Advantageously, the configuration information is also conveyed during its updating via the serial interface to the RFID reader and stored there in the predetermined configuration storage area.

In accordance with the invention, the configuration information stored in the configuration storage unit or in the configuration storage area of the RFID reader is loaded during a device start of the communication module for its configuration, specifically in dependence on a successful validity check. In addition, the configuration information stored in the predetermined configuration storage area of the RFID reader will be loaded for configuration of the replacement communication device after a successful validity check during a device start of a replacement communication module used instead of the communication module. In the case of such a device replacement, in particular, a MAC address, to be used for DHCPv4, of the communication module can be transferred to the replacement communication module. In addition, a check is performed during the validity check to at least determine whether the communication module and the replacement communication module have an identical or compatible device type. Advantageously, the configuration information will not be accepted in the case of incompatible device types.

In accordance with the invention, it is additionally checked during the validity check whether configuration information to be used for a commissioning of the replacement communication module is already stored in a configuration storage unit of the replacement communication module. The configuration information stored in the predetermined configuration storage area of the RFID reader is loaded during the device start of the replacement communication module for its configuration only when the configuration storage unit of the replacement communication module does not comprise any configuration information to be used for the commissioning of the replacement communication module or only comprises older configuration information. This makes it possible to ensure that in the case of a device exchange, only configuration information is accepted that is also actually more relevant than configuration information possibly already present in the replacement communication module.

In accordance with a further embodiment, the configuration information stored in the configuration storage unit of the replacement communication module is conveyed via the serial interface of the RFID reader and stored in the predetermined configuration storage area of the RFID reader for updating during the device start of the replacement communication module if the configuration storage unit of the replacement communication module comprises more current configuration information. Advantageously, the configuration information stored in the predetermined configuration storage area of the RFID reader will only be loaded after its updating for the configuration of the replacement communication device during the device start of the replacement communication module. This is particularly advantageous if the communication module or the replacement communication module is configured such that the configuration information, during the device start, is always loaded from the predetermined configuration storage area of the RFID reader for configuration of the communication module or of the replacement communication module, respectively.

In addition, it is additionally possible to check, during the validity check, whether the configuration information to be loaded for configuration of the replacement communication module comprises information specified as required for the device type of the replacement communication module. Here, an error is signaled if complete and permissible configuration information is neither in the configuration storage unit of the replacement communication module nor in the predetermined configuration storage area of the RFID reader for the device type of the replacement communication module. This provides at least for a reliable signaling of configuration problems.

Advantageously, a check is performed during the device start of the replacement communication module to determine whether a plurality of RFID readers are connected to the replacement communication module. In this context, that RFID reader to which the highest priority is allocated or in which the most current configuration information is stored is selected for reading out the configuration information stored there. In this manner, a best-possible supply of the replacement communication module with configuration information is ensured.

In accordance with a further embodiment of the method in accordance with the invention, before a scheduled separation of the RFID reader from the communication module, deregistration of the RFID reader from the communication module is performed. In the case of a deregistration of the RFID reader from the communication module, an inquiry is performed to determine whether the configuration information stored in the predetermined configuration storage area of the RFID reader is to be used any further. The configuration information stored in the predetermined configuration storage area of the RFID reader is deleted if it is not to be used any further. In this manner, an unwanted transmission of configuration information can be prevented, particularly in the case of a shift of an RFID reader to another communication module.

It is also an object of the invention to provide a communication module for RFID readers for performing the method in accordance with disclosed embodiments, which comprises at least one serial interface for connecting an RFID reader. In addition, the communication module has a configuration storage unit for storing configuration information comprising at least communication network address information and device type information. The communication module is configured to convey, in particular by configuration, the configuration information stored in the configuration storage unit via the serial interface to a connected RFID reader and to store it there in a predetermined configuration storage area.

In accordance with the invention, the communication module is also configured to load the configuration information stored in the configuration storage unit or in the predetermined configuration storage area of a connected RFID reader during a device start of the communication module for its configuration in dependence on a successful validity check. In addition, the communication module is configured to check, during the validity check, at least whether a replaced communication module and a replacement communication module have an identical or compatible device type.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the text which follows, the present invention will be explained in greater detail on the basis of an exemplary embodiment with reference to the drawing, in which.

DETAILED DESCRIPTION OF THE EXEMPLARY EMBODIMENTS

Figure 1:
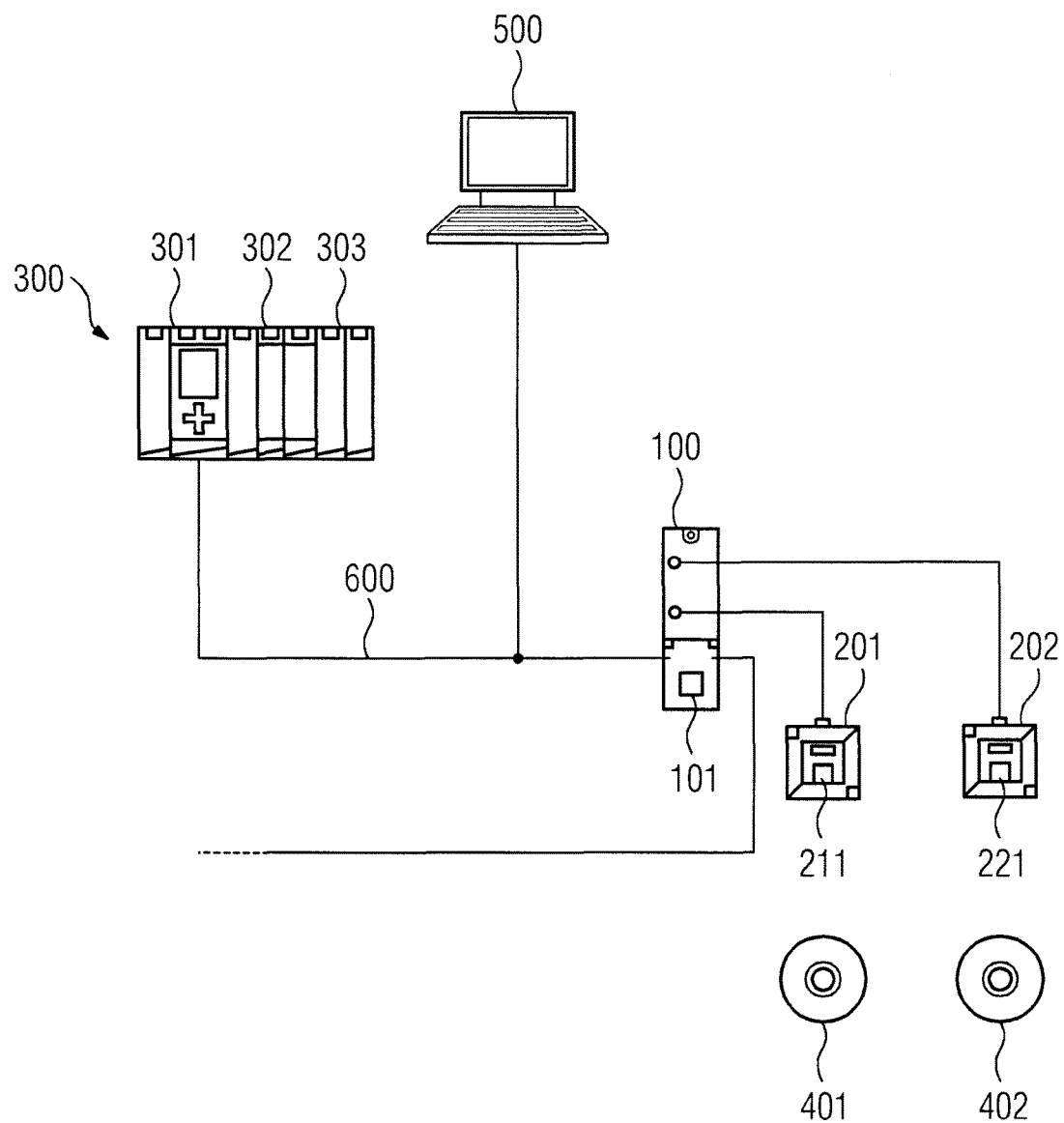
FIG. 1 shows a communication module connected to a stored-program controller via a fieldbus, to which module two RFID readers are connected.

The communication module 100 shown in FIG. 1 is connected via in each case one serial interface to two RFID readers 201, 202 and via, for example, a PROFINET-based fieldbus 600, to a stored-program controller 300. The two RFID readers 201, 202 are provided for reading from or writing to RFID transponders 401, 402. The fieldbus 600 is also connected to a computer unit 500 having a graphical user interface via which, for example, planning functions are provided for the stored-program controller 300 and configuration functions are provided for the communication module 100. For this purpose, a browser that accesses in each case a web server configured on the communication module 100 and on the stored-program controller 300 can be installed, for example, on the computer unit 500.

The stored-program controller 300 comprises a communication module 301, a central processing unit 302 and at least one input/output unit 303. The stored-program controller 300 is connected to the fieldbus 600 via the communication module 301. The input/output unit 303 is used for exchanging control and measurement variables between the stored-program controller 300 and a machine or device controlled by the stored-program controller 300. The central processing unit 302 is provided, in particular, for determining suitable control variables from detected measurement variables. The above components of the stored-program controller 300 are connected to one another via a back panel bus system in the present illustrative embodiment.

Apart from a connection for the fieldbus 600 and the serial interfaces for the RFID readers 201, 202, the communication module 100 has a configuration storage unit 101 for storing configuration information comprising at least communication network address information and device type information. The communication module 100 is configured to convey the configuration information stored in the configuration storage unit 101 via the respective serial interface to at least one connected RFID reader 201, 202 and can store the conveyed configuration information in a predetermined configuration storage area 211, 221. In principle, the configuration information can also be conveyed to both RFID readers 201, 202.

In addition, the communication module 100 is configured to load configuration information stored in the configuration storage unit 101 or in the predetermined configuration storage area 211, 221 of a connected RFID reader 201, 202 during a device start of the communication module 100 for its configuration in dependence on a successful validity check. If, instead of the communication module 100, a replacement communication module is used, then the configuration information stored in the predetermined configuration storage area 211, 221 of the respective RFID reader is loaded during a device start of the replacement communication module after a successful validity check for the configuration of the replacement communication device. In this context, the communication module 100 or the replacement communication module, respectively, is configured to check during the validity check at least whether a replaced communication module and a replacement communication module have an identical or compatible device type. The configuration information is also conveyed during its updating, which is performed, for example, via the computer unit 500, from the communication module 100 or replacement communication module via the respective serial interface to a connected RFID reader and stored there in the predetermined configuration storage area.

During the device start of the communication module 100 or of the replacement communication module, it is advantageously checked whether a plurality or several RFID readers are connected to the communication module 100 or to the replacement communication module. During this process, that RFID reader to which the highest priority is allocated or in which the most current configuration information is stored is selected for reading the configuration information stored there.

In the present illustrative embodiment, the communication module 100 is also configured for it to be checked additionally during the validity check whether configuration information to be used for commissioning is already stored in the configuration storage unit 101. The configuration information stored in the predetermined configuration storage area 211, 221 of a connected RFID reader 201, 202 is only loaded for configuration during the device start if the configuration storage unit 101 does not comprise any configuration information to be used for the commissioning or only comprises older configuration information.

In addition, the communication module 100 is configured for the configuration information stored in the configuration storage unit 101 to be conveyed during the device start via the serial interface of a connected RFID reader 201, 202 and stored in the predetermined configuration storage area 211, 221 of the RFID reader 201, 202 for updating if the configuration storage unit 101 comprises more current configuration information. The communication module 100 loads the configuration information stored in the predetermined configuration storage area 211, 221 of a connected RFID reader 201, 202 only after its updating for its configuration during the device start.

Furthermore, the communication module 100 is configured to be additionally checked during the validity check whether the configuration information to be loaded for configuration comprises information predetermined as required for its device type. If complete and permissible configuration information is present neither in the configuration storage unit 101 nor in the predetermined configuration storage area 211, 221 of a connected RFID reader 201, 202 for its device type, the communication module 100 signals an error, preferably both at the communication module 100 and at the computer unit 500.

The communication network address information can comprise, for example, a static IP address or a MAC address to be used for DHCPv4. In the latter case, the MAC address of the communication module 100 is transferred to the replacement communication module during a device replacement. In addition, the configuration information also comprises a device name of the communication module 100. Thus, the communication module 100 can be addressed not only via its IP address, which can change dynamically depending on the address assignment method used, but also via its usually unchanged device name that is transferred preferably to the replacement communication module during a device replacement.

Before a scheduled separation of an RFID reader 201, 202 from the communication module 100, deregistration of the RFID reader 201, 202 from the communication module 100 is performed. In the case of a deregistration of an RFID reader 201, 202 from the communication module 100, an inquiry is performed to determine whether the configuration information stored in the predetermined configuration storage area 211, 221 of an RFID reader 201, 202 is still to be used. The configuration information stored in the predetermined configuration storage area 211, 221 of an RFID reader 201, 202 is deleted when it is not to be used any further. In this way, an erroneous transmission of configuration information to another communication module can be prevented, particularly if no device replacement is intended at all but an RFID reader is only to be used within the context of a movement to another communication module.

Figure 2:
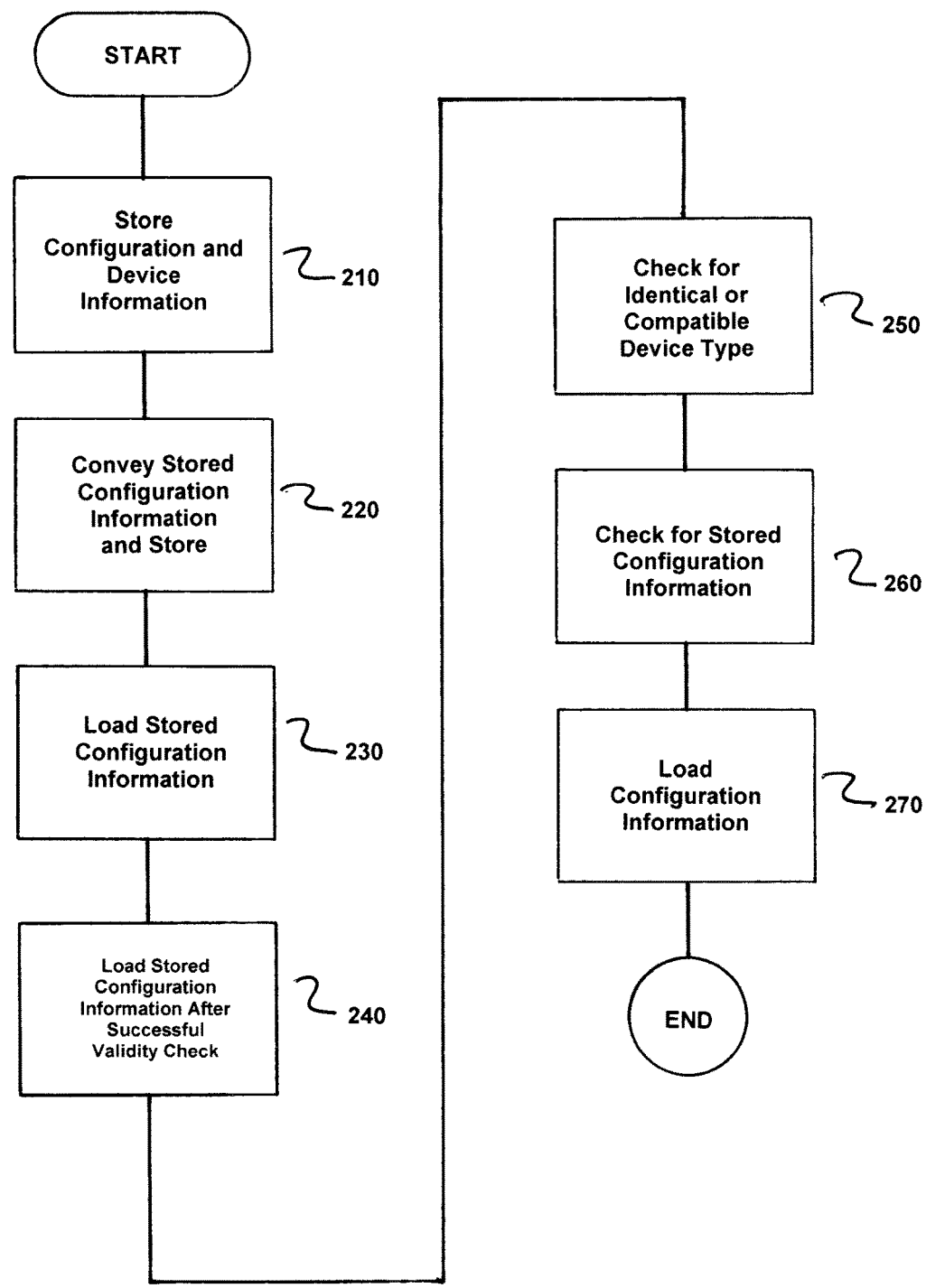
FIG. 2 is a flowchart of the method in accordance with the invention.

FIG. 2 is a flowchart of a method for configuring a communication module of at least one radio-frequency identification (RFID) reader connected via the communication module to a communication network, where the at least one RFID reader is connected to the communication module via a serial interface.

The method comprises storing configuration information comprising at least communication network address information and device type information in a configuration storage unit of the communication module, as indicated in step 210.

Next, the configuration information stored in the configuration storage unit of the communication module by the serial interface is conveyed to the at least one RFID reader and stored in a predetermined configuration storage area of the at least one RFID reader, as indicated in step 220.

The configuration information stored in the configuration storage unit or in the predetermined configuration storage area of the at least one RFID reader is now loaded during a device start of the communication module for its configuration dependent on a successful validity check, as indicated in step 230.

Next, the configuration information stored in the predetermined configuration storage area of the at least one RFID reader for configuration of a replacement communication device is loaded after a successful validity check during the device start of the replacement communication module used instead of the communication module, as indicated in step 240.

A check is performed, during the validity check, to determine whether the communication module and the replacement communication module have an identical or compatible device type, as indicated in step 250.

A check is also performed, during the validity check, to determine whether configuration information to be used for a commissioning of the replacement communication module is already stored in a configuration storage unit of the replacement communication module, as indicated in step 260.

The configuration information stored in the predetermined configuration storage area of the at least one RFID reader is now loaded during the device start of the replacement communication module for its configuration only when the configuration storage unit of the replacement communication module does not comprise any configuration information to be used for commissioning of the replacement communication module or only comprises older configuration information, as indicated in step 270.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for configuring a communication module of at least one radio-frequency identification (RFID) reader connected via the communication module to a communication network, the at least one RFID reader being connected to the communication module via a serial interface, the method comprising:
    storing configuration information comprising at least communication network address information and device type information in a configuration storage unit of the communication module;
    conveying the configuration information stored in the configuration storage unit of the communication module by the serial interface to the at least one RFID reader and storing the configuration information in a predetermined configuration storage area of the at least one RFID reader;
    loading the configuration information stored in the configuration storage unit or in the predetermined configuration storage area of the at least one RFID reader during a device start of the communication module for its configuration dependent on a successful validity check;
    loading the configuration information stored in the predetermined configuration storage area of the at least one RFID reader for configuration of a replacement communication device after a successful validity check during the device start of the replacement communication module used instead of the communication module;
    checking, during the validity check, whether the communication module and the replacement communication module have an identical or compatible device type;
    checking, also during the validity check, whether configuration information to be used for a commissioning of the replacement communication module is already stored in a configuration storage unit of the replacement communication module;
    loading the configuration information stored in the predetermined configuration storage area of the at least one RFID reader during the device start of the replacement communication module for its configuration only when the configuration storage unit of the replacement communication module does not comprise any configuration information to be used for commissioning of the replacement communication module or only comprises older configuration information.

2. The method as claimed in claim 1, wherein the configuration information stored in the configuration storage unit of the replacement communication module is conveyed via the serial interface of the at least one RFID reader and stored in the predetermined configuration storage area of the at least one RFID reader for updating during the device start of the replacement communication module if the configuration storage unit of the replacement communication module comprises more current configuration information.

3. The method as claimed in claim 2, wherein the configuration information stored in the predetermined configuration storage area of the at least one RFID reader is only loaded after its updating for the configuration of the replacement communication device during the device start of the replacement communication module.

4. The method as claimed in claim 1, further comprising:
    checking, also during the validity check, whether the configuration information to be loaded for configuration of the replacement communication module comprises information specified as required for the device type of the replacement communication module; and
    signaling an error if complete and permissible configuration information is present neither in the configuration storage unit of the replacement communication model nor in the predetermined configuration storage area of the at least one RFID reader for the device type of the replacement communication module.

5. The method as claimed in claim 1, further comprising:
    checking, during the device start of the replacement communication module whether a plurality of RFID readers are connected to the replacement communication module; and
    selecting an RFID reader from the plurality of RFID readers to which a highest priority is allocated or in which a most current configuration information is stored for reading out the configuration information stored in the selected RFID reader.

6. The method as claimed in claim 1, wherein the communication network address information comprises a static IP address or a media access control (MAC) address to be used for Dynamic Host Configuration Protocol Version 4(DHCPv4).

7. The method as claimed in claim 6, wherein the MAC address of the communication module is transmitted to the replacement communication module during a device replacement.

8. The method as claimed in claim 1, wherein the configuration information comprises a device name of the communication module.

9. The method as claimed in claim 1, wherein the configuration information is conveyed during an update thereof via the serial interface to the RFID reader and is stored there in the predetermined configuration storage area.

10. The method as claimed in claim 1, further comprising:
    performing a deregistration of the at least one RFID reader from the communication module before a scheduled separation of the at least one RFID reader from the communication module;
    performing an enquiry into whether the configuration information stored in the predetermined configuration storage area of the RFID reader is to be used any further in cases of the deregistration of the at least one RFID reader from the communication module; and deleting the configuration information stored in the predetermined configuration storage area of the at least one RFID reader if the configuration information stored in the predetermined configuration storage area of the RFID reader is not to be used any further.

11. A communication module of at least one RFID reader, comprising:
- at least one serial interface for connecting an RFID reader;
- a configuration storage unit for storing configuration information comprising at least communication network address information and device type information;
- wherein the communication module is configured to convey the configuration information stored in the configuration storage unit via the serial interface to a connected RFID reader and to store said configuration information within the connected RFID reader in a predetermined configuration storage area;
- wherein the communication module is further configured to load the configuration information stored in the configuration storage unit or in the predetermined configuration storage area of the connected RFID reader, during a device start of the communication module, for its configuration in dependence on a successful validity check;
- wherein the communication module is further configured to check, during the validity check, at least whether a replaced communication module and a replacement communication module have an identical or compatible device type;
- wherein the communication module is further configured to check, during the validity check, whether configuration information to be used for a commissioning of the replacement communication module is already stored in a configuration storage unit of the replacement communication module; and
- wherein the communication module is further configured to load the configuration information stored in the predetermined configuration storage area of the RFID reader, during a device start of the replacement communication module, for its configuration only if the configuration storage unit of the replacement communication module does not comprise any configuration information to be used for commissioning of the replacement communication module or only comprises older configuration information.

12. The communication module as claimed in claim 11, wherein the communication module is further configured to be additionally checked during the validity check to determine whether configuration information to be used for commissioning is already stored in the configuration storage unit and such that the configuration information stored in the predetermined configuration storage area of a connected RFID reader is only loaded for configuration during the device start if the configuration storage unit does not comprise any configuration information to be used for the commissioning or only comprises older configuration information.

13. The communication module as claimed in claim 12, wherein the communication module is further configured such that the configuration information stored in the configuration storage unit is conveyed during the device start via the serial interface of a connected RFID reader and stored in the predetermined configuration storage area of the RFID reader for updating if the configuration storage unit comprises more current configuration information.

14. The communication module as claimed in claim 13, wherein the communication module is further configured such that the configuration information stored in the predetermined configuration storage area of a connected RFID reader is loaded only after its updating for the configuration during the device start.

15. The communication module as claimed in claim 11, wherein the communication module is further configured to be additionally checked during the validity check to determine whether the configuration information to be loaded for configuration comprises information predetermined as required for its device type and such that an error is signaled if complete and permissible configuration information is present neither in the configuration storage unit nor in the predetermined configuration storage area of a connected RFID reader for its device type.

16. The communication module as claimed claim 11, wherein the communication module is further configured to be checked during the device start to determine whether a plurality of RFID readers are connected such that an RFID reader of the plurality of RFID readers to which a highest priority is allocated or in which a most current configuration information is stored is selected for reading out the configuration information stored in the an RFID reader.

* * * * *